(12) United States Patent
Stravinsky, II et al.

(10) Patent No.: US 12,472,886 B1
(45) Date of Patent: Nov. 18, 2025

(54) BLACK TANK BYPASS SYSTEMS AND METHODS THEREOF

(71) Applicants: Eugene G. Stravinsky, II, Wrightstown, NJ (US); Albert Mattiucci, Dunedin, FL (US)

(72) Inventors: Eugene G. Stravinsky, II, Wrightstown, NJ (US); Albert Mattiucci, Dunedin, FL (US)

( * ) Notice: Subject to any disclaimer, the term of this patent is extended or adjusted under 35 U.S.C. 154(b) by 0 days.

(21) Appl. No.: 18/605,043

(22) Filed: Mar. 14, 2024

Related U.S. Application Data

(60) Provisional application No. 63/599,166, filed on Nov. 15, 2023.

(51) Int. Cl.
*B60R 15/04* (2006.01)
*E03F 1/00* (2006.01)

(52) U.S. Cl.
CPC .............. *B60R 15/04* (2013.01); *E03F 1/008* (2013.01)

(58) Field of Classification Search
CPC ................................. B60R 15/04; E03F 1/008
USPC .............................................. 4/321, 300, 315
See application file for complete search history.

(56) References Cited

U.S. PATENT DOCUMENTS

| | | | | |
|---|---|---|---|---|
| 4,034,423 A | * | 7/1977 | Milnes | E03D 5/024 4/375 |
| 4,077,602 A | * | 3/1978 | Klessig | F16K 31/124 251/25 |
| 4,550,452 A | * | 11/1985 | Tufts | E03D 11/11 4/319 |
| 5,498,330 A | * | 3/1996 | Delle Cave | E03B 1/04 4/665 |
| 7,234,759 B1 | * | 6/2007 | Alohali | B60P 3/34 296/26.05 |
| RE42,688 E | | 9/2011 | Stegall | |
| 11,351,935 B2 | | 6/2022 | Van Beek et al. | |
| 12,252,059 B2 | * | 3/2025 | King | B60P 3/34 |
| 2005/0273917 A1 | * | 12/2005 | Lapossy | E03D 9/05 4/213 |
| 2008/0223468 A1 | | 9/2008 | Stegall | |
| 2021/0078509 A1 | | 3/2021 | Van Beek et al. | |
| 2021/0380051 A1 | | 12/2021 | Taylor et al. | |
| 2022/0221096 A1 | | 7/2022 | Wright | |

(Continued)

FOREIGN PATENT DOCUMENTS

| CA | 2582923 A1 | 1/2008 |
|---|---|---|
| CN | 112984164 A | 6/2021 |

(Continued)

*Primary Examiner* — Lori L Baker
(74) *Attorney, Agent, or Firm* — John Rizvi; John Rizvi, P.A.—The Patent Professor ®

(57) ABSTRACT

Systems and methods for bypassing a black tank, for example, in recreational vehicles are provided. A bypass valve of the system is connected to a toilet via a flange and configured to operate in a first position and a second position based on a user input. A bypass line of the system is coupled to the bypass valve at the first position and configured to transfer waste from the toilet to an exit point, bypassing a black tank based on the system being operated in a first operating mode, e.g., bypass mode. A non-bypass line of the system is coupled to the bypass valve at the second position and configured to transfer the waste from the toilet to the black tank based on the system being operated in a second operating mode, e.g., conventional mode.

19 Claims, 9 Drawing Sheets

(56) References Cited

U.S. PATENT DOCUMENTS

| | | | |
|---|---|---|---|
| 2024/0181976 A1* | 6/2024 | Getz | B60R 15/04 |
| 2025/0034854 A1* | 1/2025 | Benson | F16L 15/00 |
| 2025/0044142 A1* | 2/2025 | Tooley | G01F 23/804 |
| 2025/0065824 A1* | 2/2025 | Zeng | B60R 15/04 |

FOREIGN PATENT DOCUMENTS

| | | | |
|---|---|---|---|
| CN | 221366760 U | * | 7/2024 |
| RU | 2348547 C1 | * | 3/2009 |

\* cited by examiner

BLACK TANK BYPASS SYSTEMS AND METHODS THEREOF

CROSS-REFERENCE TO RELATED APPLICATIONS

This application claims the benefit of U.S. Provisional Patent Application Ser. No. 63/599,166 filed on Nov. 15, 2023, which is incorporated by reference herein in its entirety.

FIELD OF THE INVENTION

The present invention relates generally to bypass systems, and more particularly, to methods and systems for bypassing black tank and/or sewage, as and when required.

BACKGROUND OF THE INVENTION

Recreational vehicles, which includes a variety of campers, are widely used, and provide short-term or long-term living quarters. In this regard, a conventional recreational vehicle (RV) typically includes a toilet. Larger RVs typically include multiple toilets, and can produce several gallons of wastewater per day, which is typically stored on board and disposed of at regular intervals.

The wastewater in an RV is commonly referred to as black water. The black water comprises the water and waste from the toilet. The black water is stored in a black tank for disposing of at a later stage, usually when the black tank is almost full. A sewer hose is typically connected to the black tank with a gate valve. A user may be required to open the gate valve for disposing the waste from the black tank to a sewer or other disposal or storage device via the sewer hose.

Another problem with the conventional systems is the frequency at which the black tanks must be discharged. In order to discharge the waste from the black tank to the sewer or other storage device, for example, when the black tank is almost full, leads to wastage of water. In some conventional systems, 80 to 100 gallons of water is used to flush the black water tank on a weekly basis, which may not be considered as an environmentally friendly process.

Accordingly, there is a need for a solution to at least one of the aforementioned problems. For instance, there is an established need for a bypass system for RVs or the like having toilets therein, that are more desirable, convenient, and efficient to use in terms of disposing of waste. Further, there is an established need for an RV toilet system that saves water, as compared to conventional systems where around 80 to 100 gallons of water is used to flush the black tank on a weekly basis.

SUMMARY OF THE INVENTION

The present disclosure relates to bypass systems, for example in recreational vehicles, which enable users to dispose of waste to a black tank or directly to a sewer exit point as and when required.

In an aspect, the present disclosure relates to a bypass system, where the bypass system includes a bypass valve connected to a toilet via a flange, wherein the bypass valve is configured to switch between a first position and a second position based on a user input. Further, the bypass system includes a bypass line coupled to the bypass valve at the first position, where the bypass line is configured to transfer waste from the toilet to an exit point, bypassing a black tank, based on the bypass system being operated in a first operating mode. Furthermore, the bypass system includes a non-bypass line coupled to the bypass valve at the second position, the first position being different from the second position, where the non-bypass line is configured to transfer the waste from the toilet to the black tank based on the bypass system being operated in a second operating mode.

In an aspect, the toilet may comprise a toilet of a recreational vehicle.

In an aspect, the exit point may be a sewer exit point.

In an aspect, the bypass valve may be configured with a mechanical key, wherein the mechanical key may be turned to be in the first position to operate the bypass system in the first operating mode, and wherein the mechanical key may be turned to be in the second position to operate the bypass system in the second operating mode.

In an aspect, the bypass valve may be controlled electronically via a digital platform of a user device operated by a user, wherein the user may control the bypass valve by providing a user input via a user interface of the user device. The user interface may be associated with the digital platform. The digital platform may be a mobile application, a desktop application, a web application, or a website.

In an aspect, the user input may include one of: a swipe right action and a swipe left action on the user interface of the user device. The swipe right action may correspond to operating the bypass valve in the first position, and the swipe left action may correspond to operating the bypass valve in the second position.

In an aspect, the bypass valve may be configured electronically via a remote mounted hard-wired switch.

In an aspect, the black tank may include a black tank vent for air circulation within the black tank.

In an aspect, the bypass valve may be connected to the toilet via the flange and a pipe.

In an aspect, the non-bypass line may include a street elbow pipe, long sweep street elbow pipes, a 3-inch pipe, and a coupling to transfer the waste from the toilet to the black tank.

In an aspect, the bypass line may include street elbow pipes, a flush bushing, 3-inch pipes, a long sweep elbow pipe, and a long sweep tee pipe to transfer the waste from the toilet to the exit point, bypassing the black tank.

In an aspect, the bypass valve may include a diverter gate, and a valve seat actuation lifter, wherein the valve seat actuation lifter may lift the diverter gate for actuation.

In an aspect, the bypass valve may include an O-ring to provide a water-tight seal at the bypass valve.

In another aspect, the present disclosure relates to a bypass method for configuring a bypass system in order to dispose waste from a toilet at an appropriate site, e.g., black tank or directly to a sewer exit point.

In another aspect, a bypass valve for a bypass system is provided. The bypass valve is connected to a toilet via a flange, and the bypass valve is configured to switch between a first position and a second position based on a user input, and wherein the bypass system comprises: a bypass line coupled to the bypass valve at the first position, the bypass line being configured to transfer waste from the toilet to an exit point, bypassing a black tank, based on the bypass system being operated in a first operating mode; and a non-bypass line coupled to the bypass valve at the second position, the first position being different from the second position, and the non-bypass line being configured to transfer the waste from the toilet to the black tank based on the bypass system being operated in a second operating mode. The bypass valve comprises a diverter gate, and a valve seat actuation lifter, wherein the valve seat actuation lifter lifts the diverter gate for actuation.

In an aspect, the toilet may comprise a toilet of a recreational vehicle.

In an aspect, the bypass valve may comprise an O-ring to provide a water-tight seal at the bypass valve.

In an aspect, the bypass valve may comprise a hub knob designed to interface with one or more actuator driver devices.

In an aspect, the bypass valve may comprise a 10-degree taper with a conical valve seating surface.

In another aspect, the present disclosure relates to a bypass system, the bypass system comprises a bypass valve connected to a toilet via a flange. The bypass valve is configured to switch between a first position and a second position based on a user input. Further, the system comprises a bypass line coupled to the bypass valve at the first position, the bypass line being configured to transfer waste from the toilet to an exit point, bypassing a black tank, based on the bypass system being operated in a first operating mode. Moreover, the system comprises a non-bypass line coupled to the bypass valve at the second position, the first position being different from the second position, and the non-bypass line being configured to transfer the waste from the toilet to the black tank based on the bypass system being operated in a second operating mode; and a valve actuator operable to switch a position of the bypass valve, and thereby switch an operating mode of the bypass system.

In an aspect, the valve actuator may be a manual valve actuator.

In an aspect, the valve actuator may be an electronic valve actuator operable via a remote-mounted hard-wired switch.

In an aspect, the valve actuator may be an electronic valve actuator operable via touch commands.

In an aspect, the toilet may comprise a toilet of a recreational vehicle.

These and other objects, features, and advantages of the present disclosure will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. Unless the context requires otherwise, throughout the specification and claims which follow, the word "comprise" and variations thereof, such as, "comprises" and "comprising" are to be construed in an open, inclusive sense that is as "including, but not limited to."

The various embodiments throughout the disclosure will be explained in more detail with reference to FIGS. 1-9. In particular, shown throughout the figures, the present invention is directed towards a bypass system to dispose waste from a recreational vehicle, e.g., toilet in the recreational vehicle, to a suitable exit point. The exit point may either be a black tank or directly a sewer exit point. In accordance with some embodiments of the present disclosure, the bypass system includes a bypass valve, a bypass line, and a non-bypass line comprising a plurality of pipes and other components in order to facilitate a user to transfer the waste from the toilet to the suitable exit point. The bypass system operates in two operating modes, e.g., a conventional mode to transfer the waste to the black tank, and a bypass mode to transfer the waste directly to a sewer exit point, bypassing the black tank for efficient waste disposal. The disclosed bypass system is inexpensive to manufacture, install, maintain, and repair, increases black tank usable capacity, user convenience, and toilet reliability under various conditions with minimized utilization effort and water supply requirements, among other like benefits. The disclosed bypass system can be easily retrofitted in existing recreational vehicles or the like. These and other advantages of the disclosed bypass system will be explained in detail throughout the present disclosure.

Figure 1:
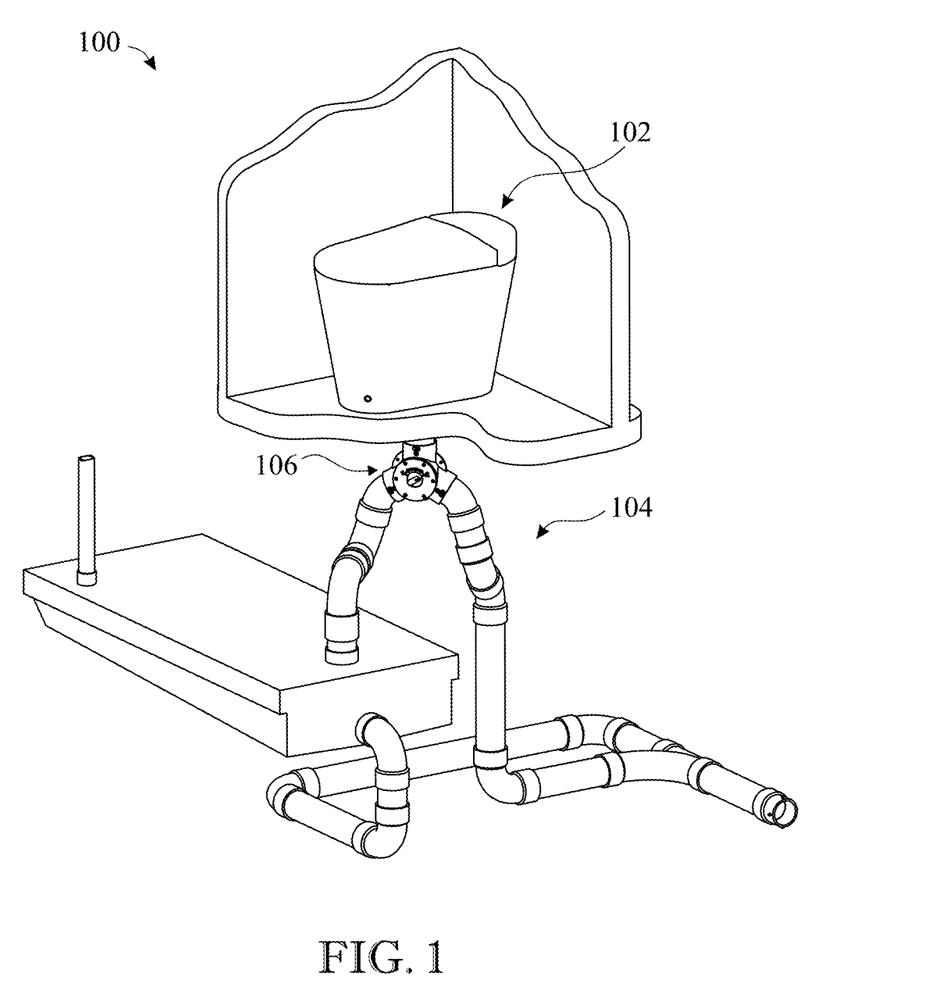
FIG. 1 shows an example representation of a black tank bypass system, in accordance with embodiments of the present disclosure.

FIG. 1 shows an example representation 100 of a black tank bypass system, in accordance with embodiments of the present disclosure.

Referring to FIG. 1, the example representation 100 includes a toilet 102 and a bypass system 104 in a recreational vehicle. In accordance with embodiments of the present disclosure, the bypass system 104 includes bypass drain plumbing as depicted to facilitate the bypass system 104 to operate and switch between two modes, e.g., a conventional mode and a bypass mode.

In some embodiments, when operating in the conventional mode, the bypass system 104 may flush toilet waste to a black tank sewage containment. Alternatively, in some embodiments, when operating in the bypass mode, the bypass system 104 may bypass the black tank and flush the waste from the toilet 102 straight to a sewer connection when available. A person of ordinary skill in the art will understand that black tank may store waste, e.g., black water which is the water and waste from the toilet 102.

Referring to FIG. 1, the bypass system 104 includes a bypass valve 106. Therefore, the bypass valve 106 is shown as installed such as to provide a sewer bypass to convey or transfer the waste from the toilet 102 to the sewer connection while sewage flow to the black tank is prevented. This will be further explained in detail throughout the disclosure.

It may be appreciated that the bypass system 104 may be configured for any recreational vehicle within the scope of the present disclosure.

Figure 2:
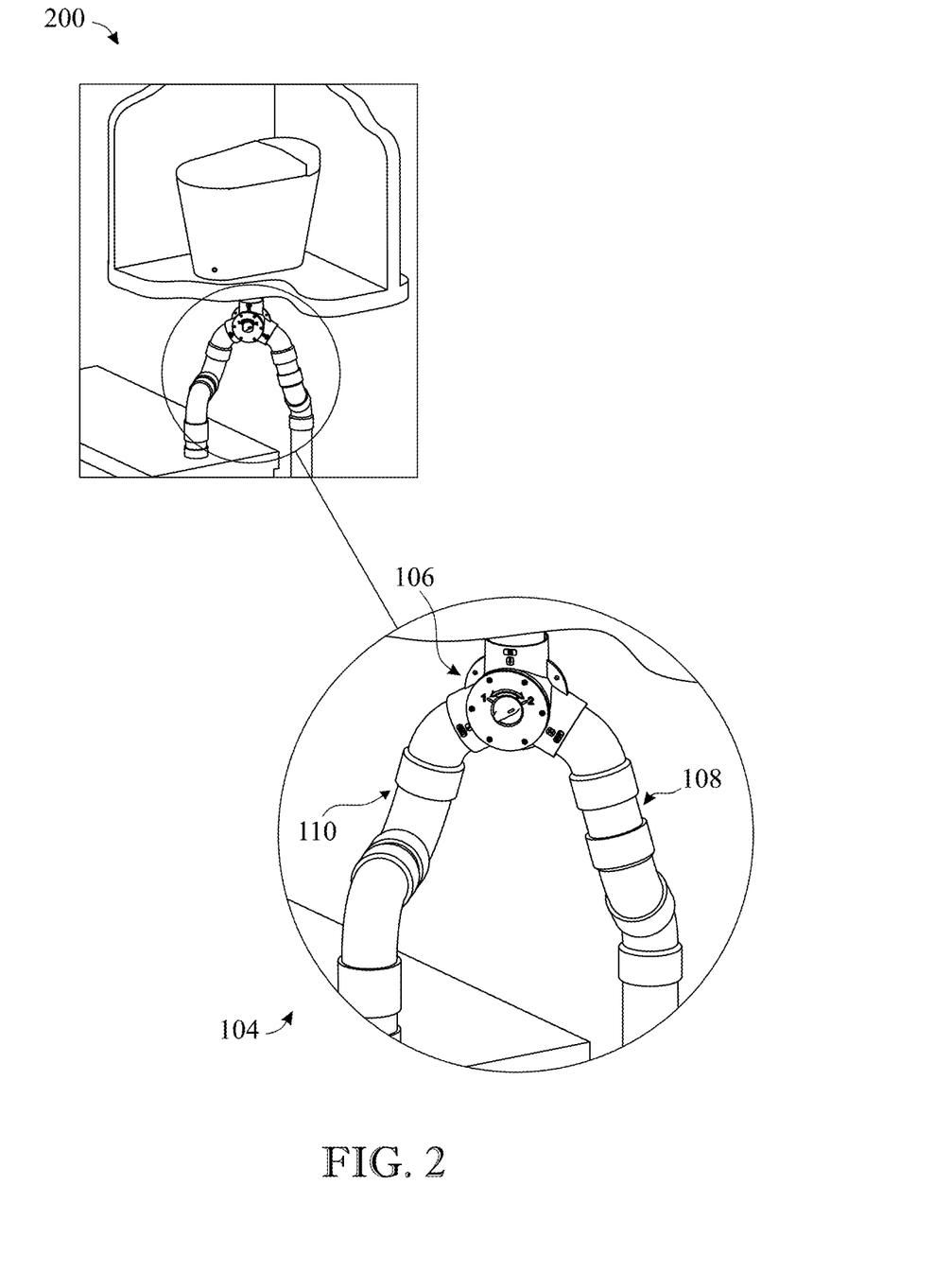
FIG. 2 shows an example representation of a bypass valve implemented in the bypass system of FIG. 1, in accordance with embodiments of the present disclosure.

FIG. 2 shows an example representation 200 of a bypass valve (e.g., 106) implemented in a bypass system (e.g., 104), in accordance with embodiments of the present disclosure.

Referring to FIG. 2, the example representation 200 includes the bypass valve 106 being implemented in the bypass system 104. The bypass system 104 further includes a bypass line 108 and a non-bypass line 110. In some embodiments, the bypass valve 106 may be configured as a mechanical key. A user may turn or switch the bypass valve 106 to use a black tank or bypass the black tank, as necessary. For example, one exit point for the bypass valve 106 may be a sewer connection to get rid of waste through a sewer hose, and another exit point for the bypass valve 106 may be the black tank to store the waste until the user may want to evacuate the same. Therefore, the user may turn or switch the mechanical key of the bypass valve 106 in a first position or a second position to dispose the waste as necessary such that if the user turns or switches the mechanical key in the first position, the bypass system 104 may operate in a first operating mode, e.g., bypass mode, and if the user turns or switches the mechanical key in the second position, the bypass system 104 may operate in a second operating mode, e.g., conventional mode. In other words, the mechanical key may switch the position of the bypass valve from the first position to the second position and vice-versa.

Referring to FIG. 2, in the bypass mode, the bypass line 108 may allow the waste to be transferred to the sewer connection, thereby bypassing the black tank. In the conventional mode, the non-bypass line 110 may allow the waste to be stored in the black tank. Therefore, by controlling the mechanical key of the bypass valve 106, the user may either bypass a path to the black tank leading the waste to a sewer or store the waste at the black tank for later disposal.

In some other embodiments, the bypass valve 106 may be programmed electronically to work in association with a touchscreen. For example, the user may use a user device having a user interface to control the bypass system 104 e.g., modes of the bypass system 104 by controlling the bypass valve 106. This will be explained in detail with reference to FIG. 5.

Figure 3:
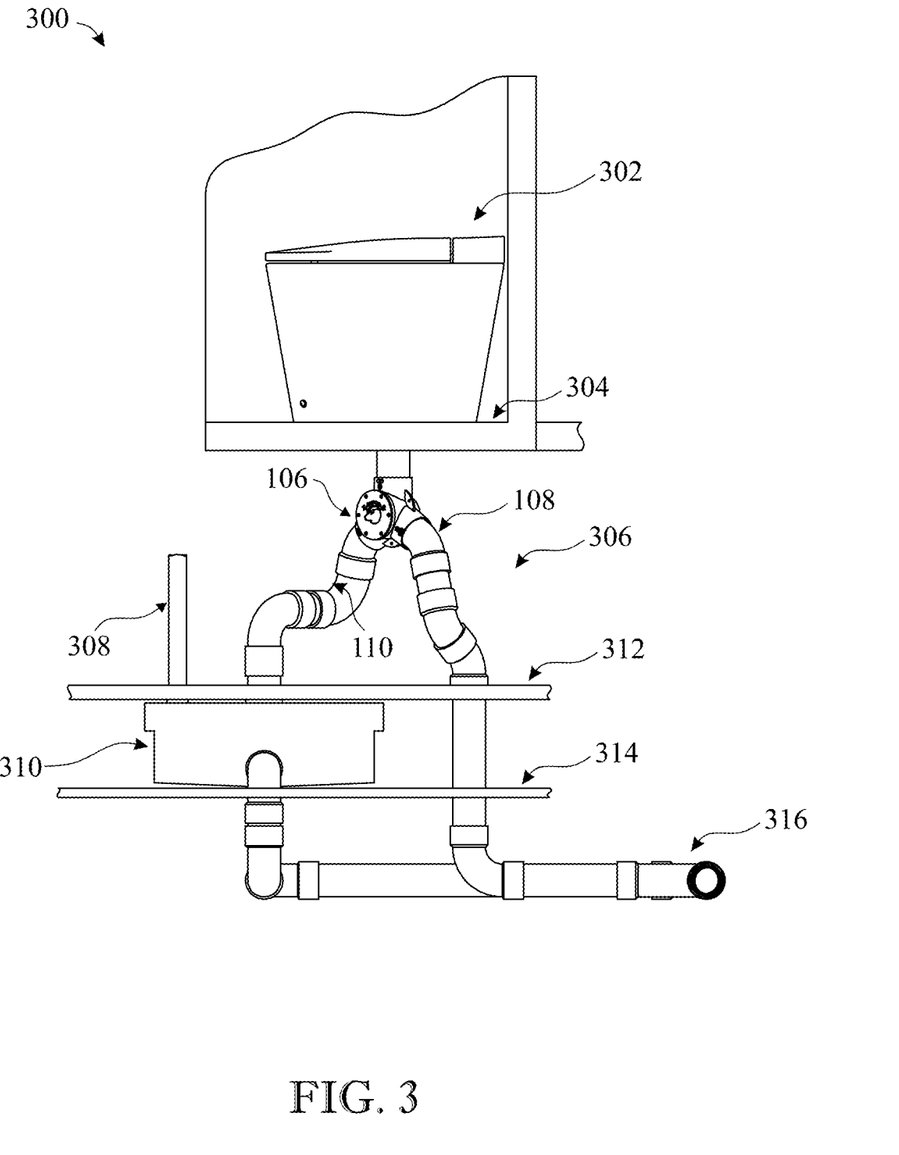
FIG. 3 shows an example representation of a side view of the black tank bypass system of FIG. 1, in accordance with embodiments of the present disclosure.

FIG. 3 shows an example representation 300 of a side view of the black tank bypass system, in accordance with embodiments of the present disclosure.

Referring to FIG. 3, the example representation 300 includes a toilet 302, an interior floor 304, a bypass system 306, a black tank vent 308, a black tank 310, an under storage sub-floor 312, an undercarriage cover 314, and an exit point 316. The bypass system 306 includes a bypass valve 106, a bypass line 108, and a non-bypass line 110, as discussed above with reference to FIG. 2. As depicted, the bypass system 306 may be connected to the toilet 302 through the interior floor 304. The bypass system 306 may be configured or placed between the interior floor 304 and the under storage sub-floor 312. The black tank 310 may be configured between the under storage sub-floor 312 and the undercarriage cover 314. In some embodiments, the toilet 302 may include a draw latch (not shown) to keep tank lid of the toilet 302 in place during travel.

In accordance with embodiments of the present disclosure, waste out of the toilet 302 may pass to the bypass system 306 when a user flushes the waste. The bypass system 306 operates in two modes under control of the bypass valve 106. The first mode is a bypass mode, wherein when the bypass valve 106 is configured in a first position, the waste may be transferred to a sewer connection via the bypass line 108, thereby bypassing the black tank 310. For example, as depicted, the waste may be transferred from the toilet 302 to the bypass system 306 through the bypass line 108, and finally to the exit point 316 (e.g., sewer exit point). The second mode is a conventional mode, wherein when the bypass valve 106 is configured in a second position, the waste may be transferred to the black tank 310 via the non-bypass line 110 for storage. The black tank 310 may include the black tank vent 308 for appropriate air circulation within the black tank 310. The bypass valve 106, when in the first position, blocks a path to the black tank 310. Similarly, the bypass valve 106, when in the second position, blocks a path to the sewer connection. It may be appreciated that the bypass valve 106 may be configured in the first position or the second position as necessary by the user, wherein the bypass valve 106 may be configured as a mechanical key. The user may turn or switch the mechanical key, i.e., the bypass valve 106 in the first position to transfer the waste to the sewer exit point 316, and switch the mechanical key in the second position to transfer the waste to the black tank 310. It may be noted that the first position may be opposite to the second position.

Referring to FIG. 3, in some embodiments, a height between the interior floor 304 and the under storage sub-floor 312 may be 21¾ inches. It may be appreciated that the interior floor 304, the under storage sub-floor 312, and the undercarriage cover 314 may be made of suitable materials, as known to a person skilled in the art.

Figure 4:
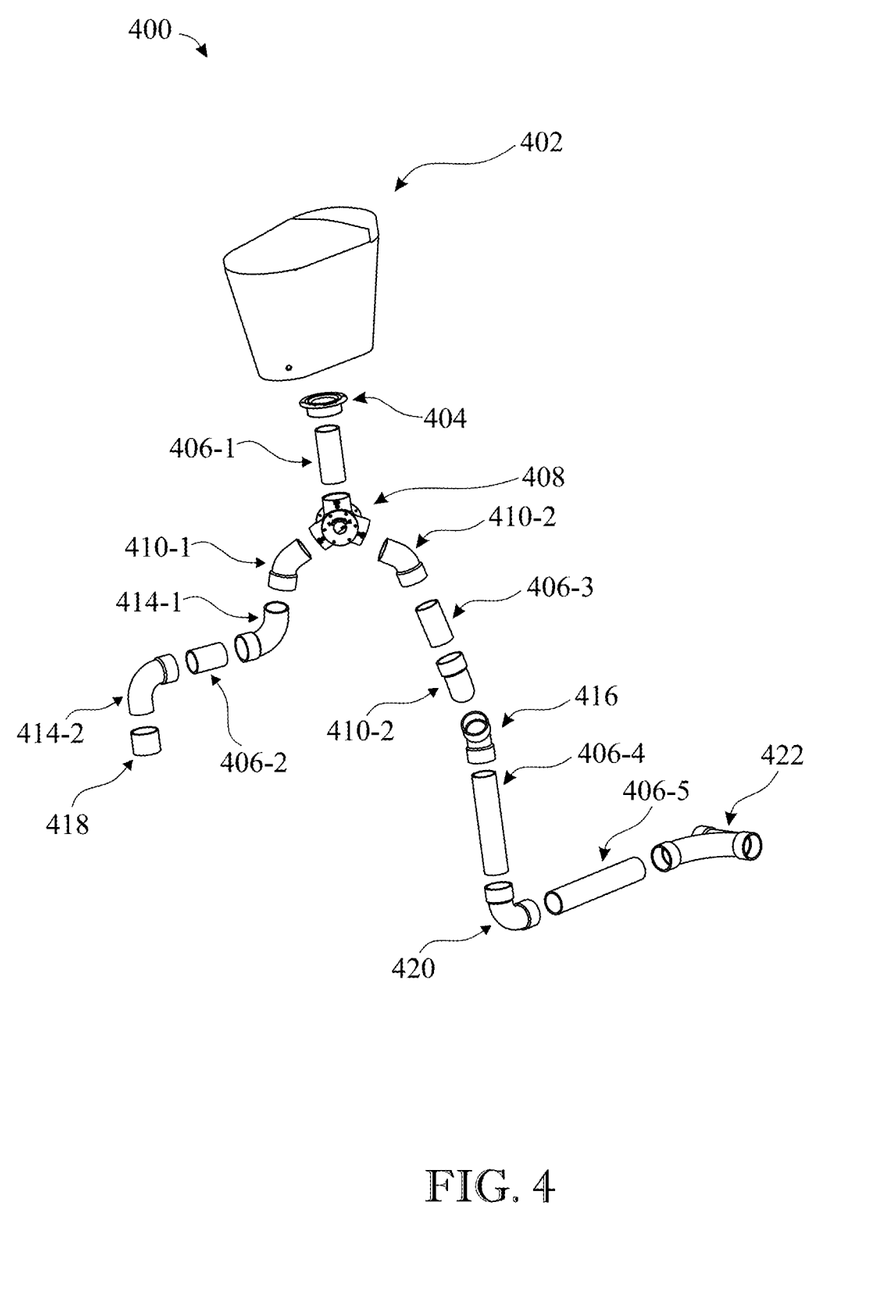
FIG. 4 shows an example representation of different components of an example black tank bypass system, in accordance with embodiments of the present disclosure.

FIG. 4 shows an example representation 400 of different components of an example black tank bypass system, in accordance with embodiments of the present disclosure.

Referring to FIG. 4, the example representation 400 includes a toilet 402, a toilet flange 404, one or more pipes (406-1, 406-2, 406-3, 406-4, 406-5), a bypass valve 408, one or more street elbow pipes (410-1, 410-2), one or more long sweep street elbow pipes (414-1, 414-2), an elbow pipe 416, a coupling 418, a long sweep elbow pipe 420, and a long sweep tee pipe 422. It may be appreciated that the bypass valve 408 may be similar to the bypass valve 106 of FIGS. 1-3 in its functionality.

In some embodiments, the bypass valve 408 may be connected to the toilet 402 via the toilet flange 404 and a pipe 406-1. In some embodiments, the pipe 406-1 may be a 4-inch pipe cut to 8-inch length. However, there may be other configurations of the pipe 406-1 within the scope of the present disclosure.

Referring to FIG. 4, the street elbow pipe 410-1, the long sweep street elbow pipes (414-1, 414-2), the pipe 406-2, and the coupling 418 form a non-bypass line (e.g., non-bypass line 110). The non-bypass line 110 thus formed may transfer waste from the toilet 402 to a black tank (e.g., black tank 310). In some embodiments, the pipe 406-2 may be a 3-inch pipe cut to 5-inch length. Similarly, the street elbow pipe 410-2, the pipe 406-3, the street elbow pipe 410-2, the elbow pipe 416, the pipe 406-4, the long sweep elbow pipe 420, the pipe 406-5, and the long sweep tee pipe 422 form a bypass line (e.g., bypass line 108). The bypass line 108 thus formed may transfer the waste from the toilet 402 to a sewer connection or exit point, bypassing the black tank. In some embodiments, the pipe 406-3 may be a 3-inch pipe cut to 6-inch length, the pipe 406-4 may be a 3-inch pipe cut to 15-inch length, and the pipe 406-5 may be a 3-inch pipe cut to 18-inch length. It may be appreciated that other configurations may be possible for all components as suitable within the scope of the present disclosure.

It may be appreciated that other configurations of pipes to form the bypass system as disclosed herein may be possible within the scope of the present disclosure.

Figure 5:
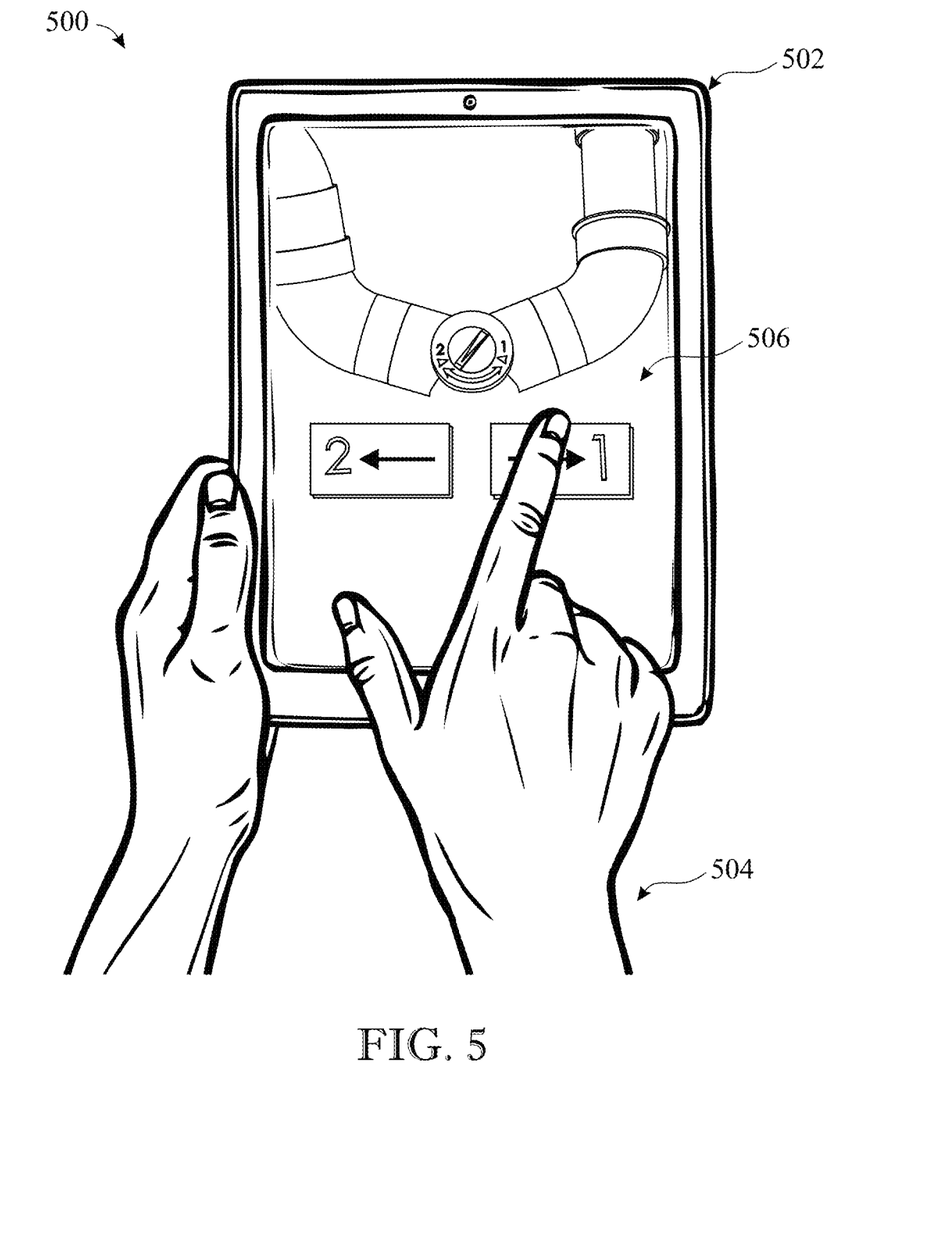
FIG. 5 shows an example representation of a user interface for operating a bypass valve electronically in an example black tank bypass system, in accordance with embodiments of the present disclosure.

FIG. 5 shows an example representation 500 of a user interface for operating a bypass valve electronically in an example black tank bypass system, in accordance with embodiments of the present disclosure.

Referring to FIG. 5, the example representation 500 includes a user device 502 being operated by a user 504. In some embodiments, the user device 502 includes a digital platform communicatively coupled with a bypass valve (e.g., 106). In some embodiments, the digital platform may be a mobile application ("app"). The mobile application may be installed on the user device 502. In some embodiments, the digital platform may be a web application (e.g., a website or a webpage). In some embodiments, the digital platform may be a desktop application. The digital platform in conjunction with a processing unit (not shown) may render a graphical user interface 506 on the user device 502 such that the user 504 of the user device 502 may control the bypass valve 106 via the graphical user interface 506 rendered on the user device 502.

In some embodiments, the user device 502 may include, but is not limited to, a handheld wireless communication device (e.g., a mobile phone, a smart phone, and so on), a wearable computer device (e.g., a head-mounted display computer device, a head-mounted camera device, a wristwatch computer device, and so on), a laptop computer, a tablet computer, or another type of portable computer, and/or any other type of user device 502 with wireless communication capabilities, and the like. In some embodiments, the user device 502 may include, but is not limited to, any electrical, electronic, electro-mechanical, or an equipment, or a combination of one or more of the above devices such as virtual reality (VR) devices, augmented reality (AR) devices, laptop, a general-purpose computer, desktop, personal digital assistant, tablet computer, mainframe computer, or any other computing device, wherein the user device 502 may include one or more in-built or externally coupled accessories including, but not limited to, a visual aid device such as camera, audio aid, a microphone, a keyboard, and input devices for receiving input from the user 504 such as touch pad, touch enabled screen, electronic pen, and the like.

A person of ordinary skill in the art will appreciate that the user device 502 may not be restricted to the mentioned devices and various other devices may be used.

In accordance with embodiments of the present disclosure, the user 504 may use the digital platform on the user device 502 that allows the user 504, for example but not limited to, to switch operating modes of the bypass system 104, e.g., by controlling position of the bypass valve 106 to bypass or allow transfer of waste from/to a black tank. For example, the user device 502, including a touchscreen, may use one or more fingers, a stylus, or an electronic pen or the like to control the position of the bypass valve 106. In an example embodiment, the user 504 may swipe right to configure the bypass valve 106 in a first position, thereby configuring the bypass system 104 in a bypass mode, i.e., allow transfer of waste via a bypass line (e.g., 108) to a sewer exit point, thereby bypassing a black tank. In another example embodiment, the user 504 may swipe left to configure the bypass valve 106 in a second position, thereby configuring the bypass system 104 in a conventional mode, i.e., allow transfer of the waste via a non-bypass line (e.g., 110) to the black tank. It may be noted that right swipe corresponding to the first position and left swipe corresponding to the second position of the bypass valve 106 is depicted for example purposes, and the vice versa may be applicable for configuring the bypass system 104 in a particular operating mode.

Therefore, based on user input, i.e., swipe left or swipe right, the bypass valve 106 may be configured to switch between positions corresponding to the operating modes of the bypass system to either bypass the black tank or dispose the waste at the black tank. Accordingly, the system and methods of the present disclosure provide a sanitary, convenient, and environmentally beneficial system for disposing of waste from a recreational vehicle.

In some embodiments, the bypass system 104 or the bypass valve 106 may be configured to be controlled by voice commands. For example, the user 504 may provide a voice command to control position of the bypass valve 106 to bypass or allow transfer of waste from/to the black tank. The voice commands may be provided using the user device 502. In some embodiments, the bypass system 104 may be a smart bypass system 104 that can be controlled through voice recognition such as by using virtual assistants or software agents such as but not limited to Alexa™, Google™, Siri™, or the like. In such embodiments, voice commands provided to the virtual assistant may change position of the bypass valve 106 to be in the first position or the second position, thus controlling the disposal of the black water to the black tank or the sewer exit point as desired by the user e.g., an owner or operator of a recreational vehicle where the disclosed bypass system is installed.

Figure 6:
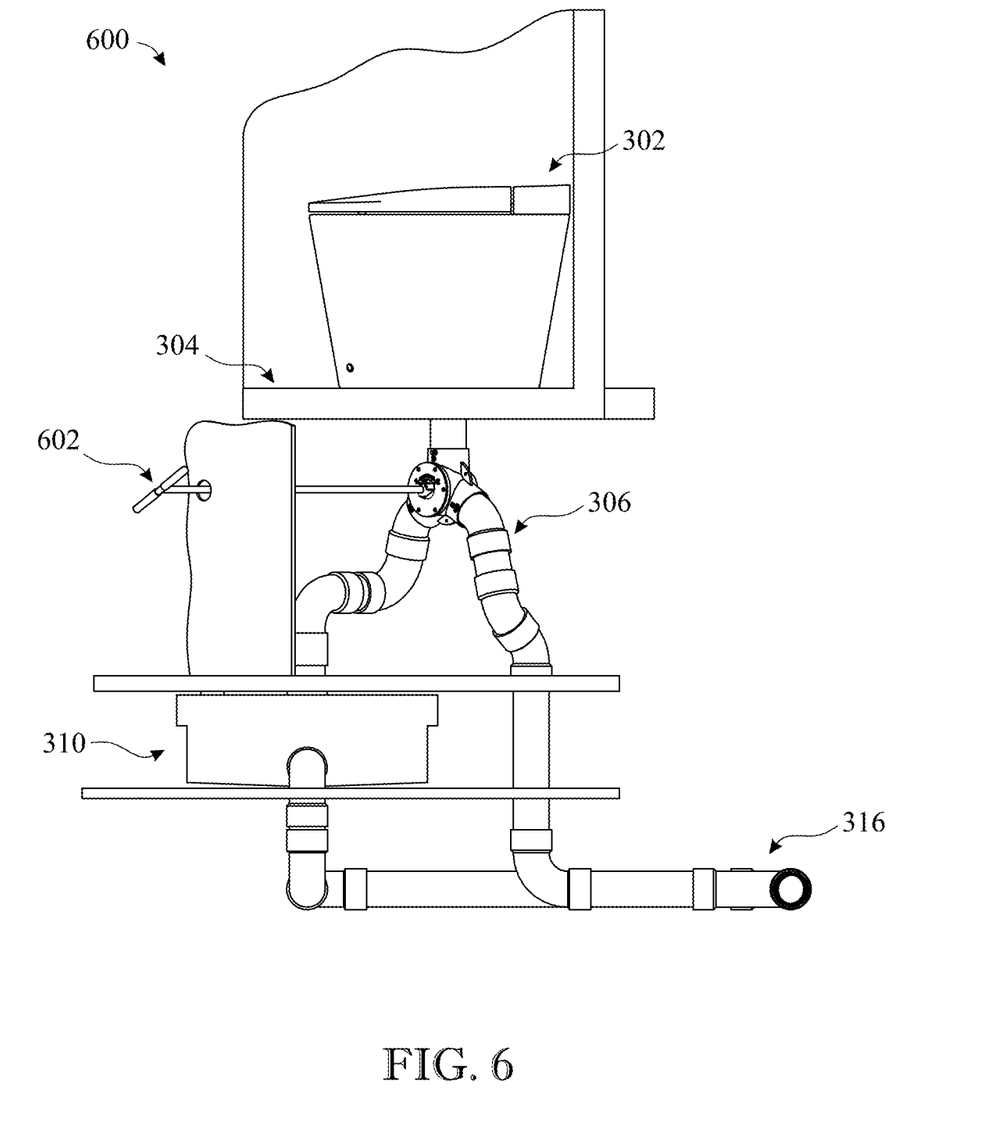
FIG. 6 shows an example representation of a side view of a black tank bypass system, in accordance with some other embodiments of the present disclosure.

FIG. 6 shows an example representation 600 of a side view of the black tank bypass system, in accordance with some other embodiments of the present disclosure.

Referring to FIG. 6, the example representation 600 includes a toilet 302, an interior floor 304, a bypass system 306, a black tank 310, an exit point 316, and a manual valve actuator 602. The bypass system 306 includes a bypass valve 106, a bypass line 108, and a non-bypass line 110, as discussed above with reference to FIGS. 2 and 3. In some embodiments, the toilet 302 may include a draw latch (not shown) to keep tank lid of the toilet 302 in place during travel.

In accordance with embodiments of the present disclosure, waste out of the toilet 302 may pass to the bypass system 306 when a user flushes the waste. The bypass system 306 operates in two modes under control of the bypass valve 106. In some embodiments, a user may switch the modes of the bypass system 306 using the manual valve actuator 602. It may be appreciated that the bypass valve 106 may be configured in a first position or a second position as necessary by the user, wherein the bypass valve 106 may be configured using the manual valve actuator 602. The user may turn or switch the manual valve actuator 602, i.e., the bypass valve 106 in the first position to transfer the waste to the sewer exit point 316, and switch the manual valve actuator 602 in the second position to transfer the waste to the black tank 310. It may be noted that the first position may be opposite to the second position.

In some embodiments, a height between the interior floor 304 and the black tank may at least be 22 inches. As shown in FIG. 6, the manual valve actuator 602 includes a U-shaped end, a steel body, and a T-handle. In some embodiments, the T-handle may be 9-inches wide. The T-handle may be gripped by the user to turn or switch the manual valve actuator 602 thereby controlling the position of the bypass valve 106. In some embodiments, the T-handle may be covered with vinyl to provide leverage in turning stuck valves. In some embodiments, the body of the manual valve actuator 602 may be powder coated. It may be appreciated that other suitable configurations of the manual valve actuator may be possible within the scope of the current disclosure.

Figures 7A, 7B, 7C:
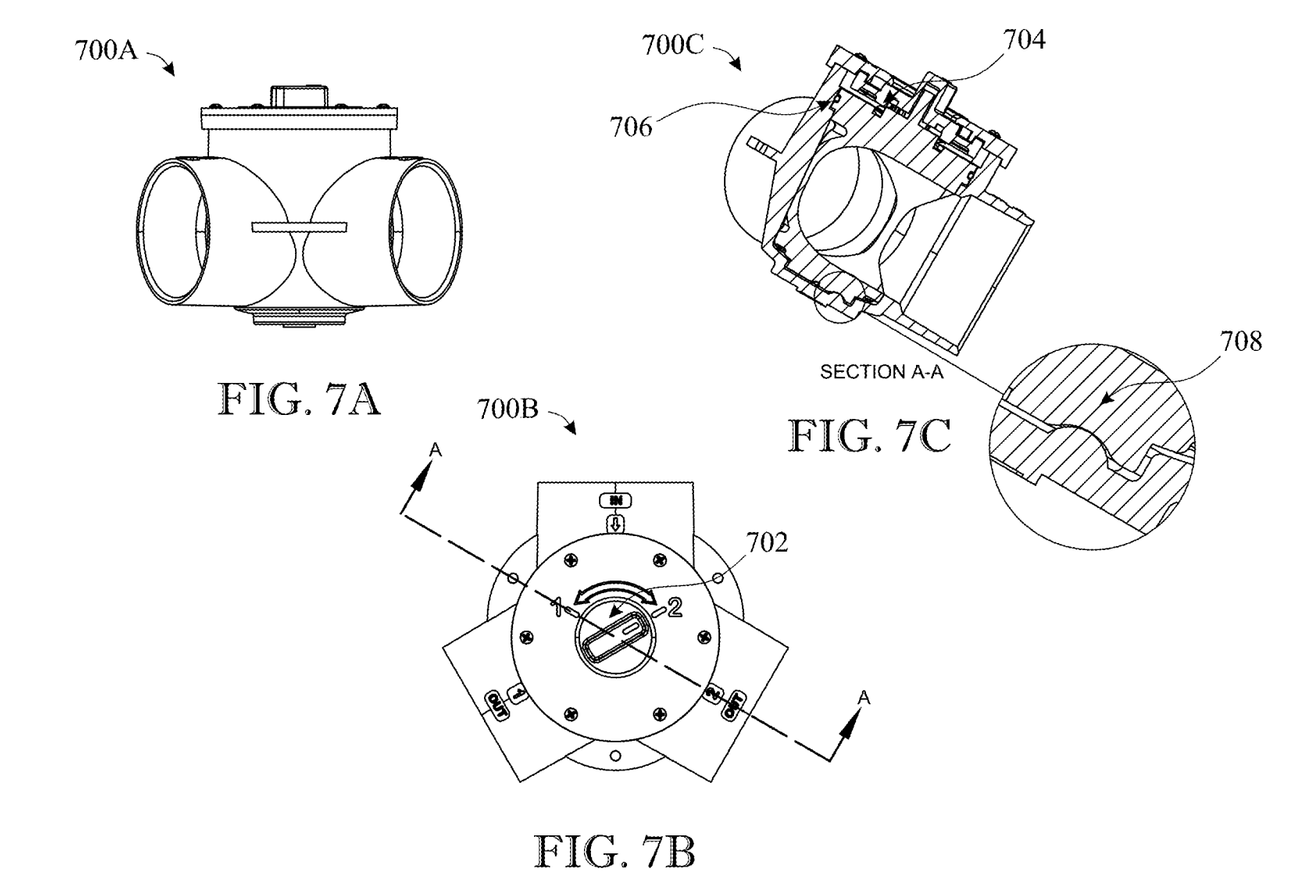
FIGS. 7A-7C show example representations of a bypass valve, in accordance with embodiments of the present disclosure.

FIGS. 7A-7C show example representations (700A, 700B, 700C) of the bypass valve (e.g., bypass valve 106), in accordance with embodiments of the present disclosure.

Referring to FIG. 7A, the example representation 700A depicts a rear-side-view of the bypass valve 106. In particular, a bypass line (e.g., 108) and a non-bypass line (e.g., 110) may be configured with the bypass valve 106 to transfer waste from a toilet to an appropriate location, for example, a black tank or a sewer exit point. In some embodiments, the bypass valve 106 has a full 3-inches diameter orifice and a two-way variable flow, including black Acrylonitrile Butadiene Styrene (ABS) construction.

Referring to FIG. 7B, the example representation 700B depicts a front-view of the bypass valve 106. In some embodiments, the bypass valve 106 includes a hub knob 702 designed to interface with multiple actuator driver devices. In some embodiments, an injection molded handle (not shown) may be included with the bypass valve 106.

Referring to FIG. 7C, the example representation 700C depicts a sectional view of the bypass valve 106 of FIG. 7B. As shown in FIG. 7c, the bypass valve 106 comprises a 10-degree taper, with a conical valve seating surface. Moreover, the bypass valve 106 includes a wave disc spring 704, an O-ring 706, and a valve seat actuation lifter 708. In some embodiments, the valve seat actuation lifter 708 may lift a diverter gate to enable the bypass valve 106 to spin or actuate freely. Further, the O-ring 706 facilitates to achieve water-tight seal at control side of the bypass valve 106.

Figure 8:
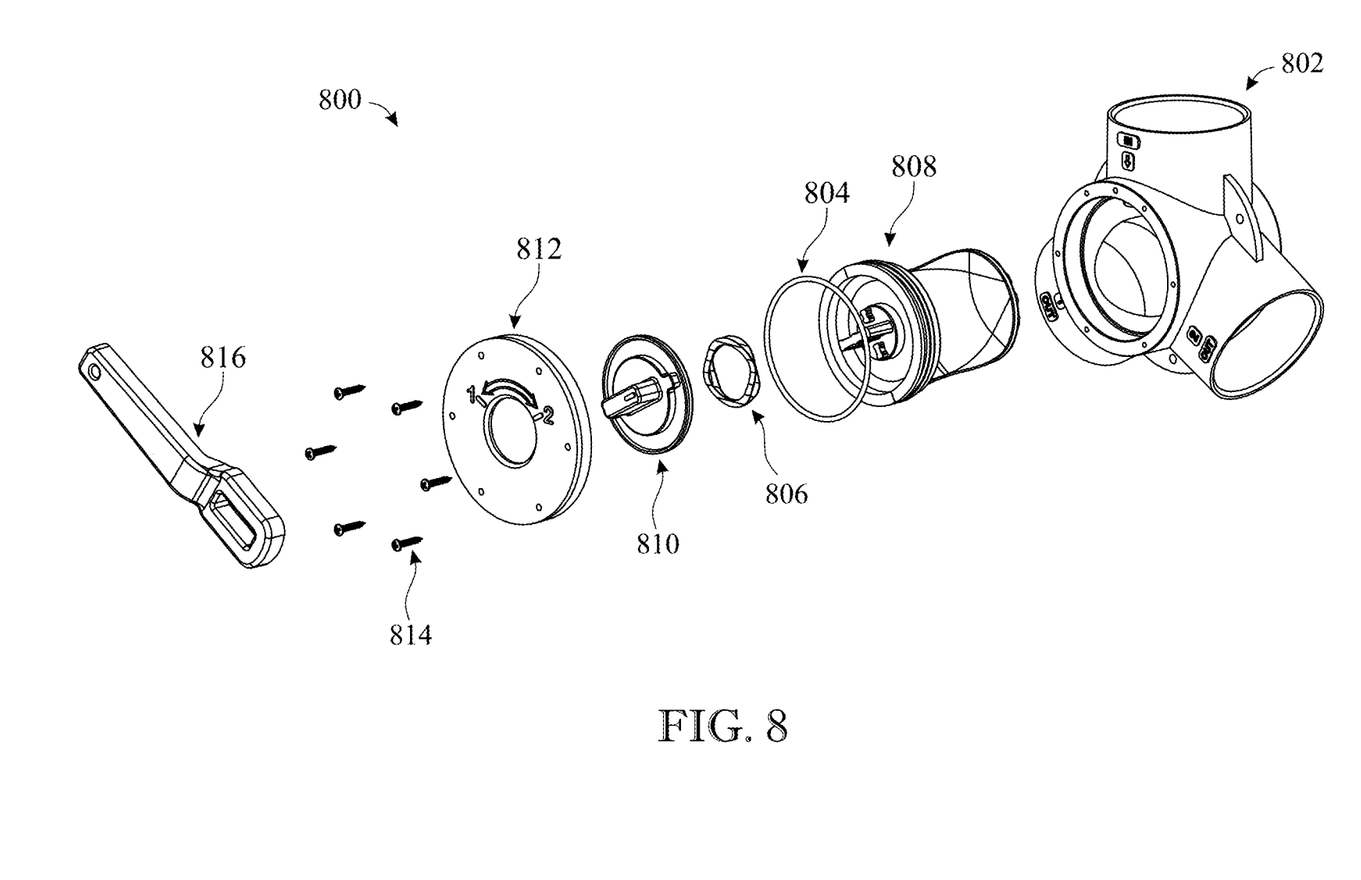
FIG. 8 shows an example representation of different components of the bypass valve, in accordance with embodiments of the present disclosure.

FIG. 8 shows an example representation of different components of a bypass valve 800 (is analogous to a bypass valve 106, and bypass valve 408), in accordance with embodiments of the present disclosure.

Referring to FIG. 8, the bypass valve 800 includes a valve body 802, an O-ring 804, a stacked wave disc spring 806, a diverter gate 808, a knob 810, a cover 812, one or more screws 814, and a handle 816. In some embodiments, the one or more screws 814 may be used to affix the cover 812 to the knob 810.

Figure 9:
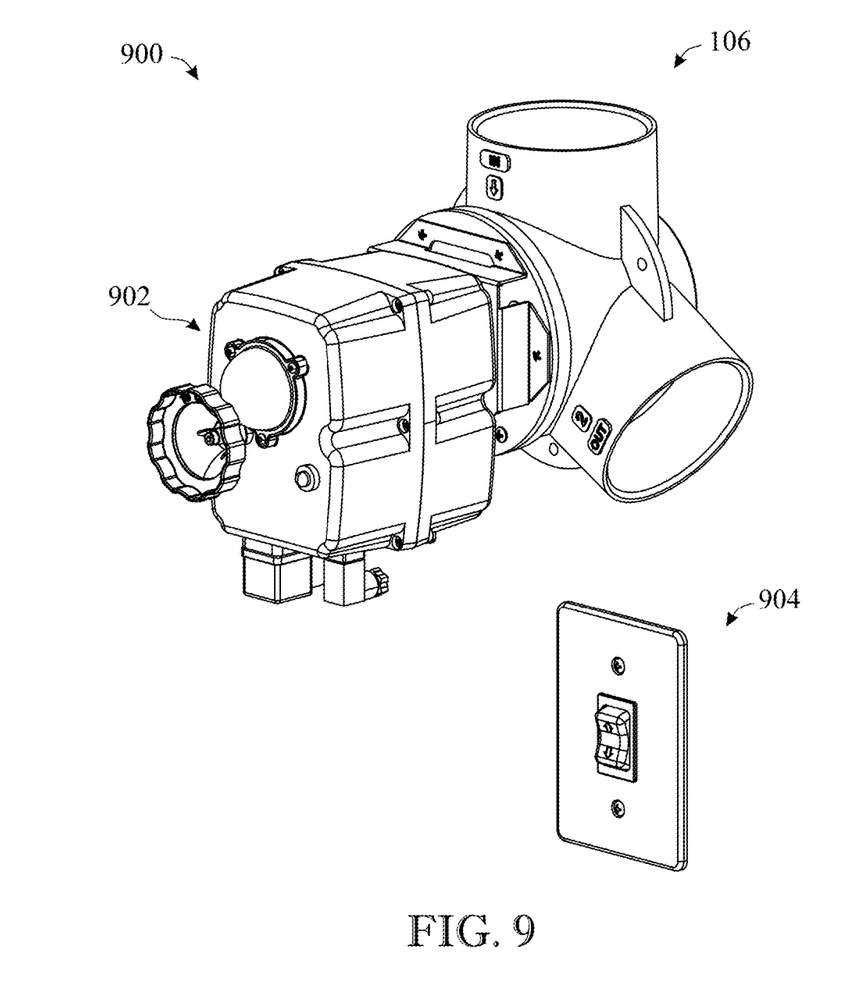
FIG. 9 shows an example representation for operating a bypass valve electronically in an example black tank bypass system, in accordance with another embodiment of the present disclosure.

FIG. 9 shows an example representation 900 for operating a bypass valve electronically in an example black tank bypass system, in accordance with another embodiment of the present disclosure.

Referring to FIG. 9, the example representation 900 includes a bypass valve 106 and an electronic valve actuator 902. In some embodiments, the electronic valve actuator 902 may be operated via a remote mounted hard-wired switch 904 or integrated to function via a smart touch pad control system. In some embodiments, the electronic valve actuator 902 may be operated at 12 Volts. In some embodiments, the electronic valve actuator 902 may be pre-installed to the bypass valve 106. Therefore, by using the ON or OFF button on the switch 904, a user may operate the electronic valve actuator 902, for example, configure a position of the bypass valve 106 to control an operating mode of a bypass system (e.g., 104 or 306) 12V.

It may be noted that the bypass system, as discussed herein, helps in saving water to a great extent. For example, conventional systems and methods use around 75 to 80 gallons of water to flush back the black tank on a weekly basis. Further, in conventional systems and methods, a sewer connection connects the black tank to a sewer hose to dispose of the waste, which is a least desirable way to get rid of the waste. Therefore, the present disclosure facilitates to directly flush out the waste to the sewer hose, without having to connect the black tank to the sewer hose.

Though the present disclosure describes bypass methods, systems, and devices in reference to recreational vehicles, however it is contemplated that the bypass methods, systems, and devices described herein may be used in any application where the black tank or sewage containment tank is being employed to store waste from the toilet. For example, the bypass methods, systems, and devices (e.g., valves) may be employed in mobile homes, campers, house trailers, motor homes, vehicles, or any other system that comprises a toilet and a sewage containment arrangement (e.g., black tank).

In some embodiments, the method or methods described above may be executed or carried out by a computing system including a tangible computer-readable storage medium, also described herein as a storage machine, that holds machine-readable instructions executable by a logic machine (e.g., a processor or programmable control device) to provide, implement, perform, and/or enact the above-described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an API.

Since many modifications, variations, and changes in detail can be made to the described preferred embodiments of the disclosure, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A bypass system, comprising:
    a bypass valve connected to a toilet via a flange, the bypass valve being configured to switch between a first position and a second position based on a user input, wherein the bypass valve comprises an O-ring to provide a water-tight seal at the bypass valve;
    a bypass line coupled to the bypass valve at the first position, the bypass line being configured to transfer waste from the toilet to an exit point, bypassing a black tank, based on the bypass system being operated in a first operating mode; and
    a non-bypass line coupled to the bypass valve at the second position, the first position being different from the second position, and the non-bypass line being configured to transfer the waste from the toilet to the black tank based on the bypass system being operated in a second operating mode.

2. The system of claim 1, wherein the toilet comprises a toilet of a recreational vehicle.

3. The system of claim 1, further comprising:
    a mechanical key configured to turn the bypass valve from the first position to the second position and vice-versa.

4. The system of claim 1, wherein the bypass valve is controllable electronically via a digital platform.

5. The system of claim 4, wherein the bypass valve switches the position based on the user input provided via a user interface associated with the digital platform.

6. The system of claim 5, wherein the user input comprises a swipe right action and a swipe left action on the user interface, wherein the swipe left action corresponds to operating the bypass valve in the second position, and wherein the swipe right action corresponds to operating the bypass valve in the first position.

7. The system of claim 1, wherein the bypass valve is controllable electronically via a remote mounted hard-wired switch.

8. The system of claim 1, wherein the bypass valve is connected to the toilet via the flange and a pipe.

9. The system of claim 1, wherein the non-bypass line comprises a street elbow pipe, long sweep street elbow pipes, a 3-inch pipe, and a coupling to transfer the waste from the toilet to the black tank.

10. The system of claim 1, wherein the bypass line comprises street elbow pipes, a flush bushing, 3-inch pipes, a long sweep elbow pipe, and a long sweep tee pipe to transfer the waste from the toilet to the exit point, thereby bypassing the black tank.

11. The system of claim 1, wherein the bypass valve comprises a diverter gate, and a valve seat actuation lifter, and wherein the valve seat actuation lifter lifts the diverter gate for actuation.

12. A bypass valve for a bypass system, wherein the bypass valve is connected to a toilet via a flange, and the bypass valve is configured to switch between a first position and a second position based on a user input, and wherein the bypass system comprises: a bypass line coupled to the bypass valve at the first position, the bypass line being configured to transfer waste from the toilet to an exit point, bypassing a black tank, based on the bypass system being operated in a first operating mode; and a non-bypass line coupled to the bypass valve at the second position, the first position being different from the second position, and the non-bypass line being configured to transfer the waste from the toilet to the black tank based on the bypass system being operated in a second operating mode, the bypass valve comprising:

a diverter gate, and a valve seat actuation lifter, wherein the valve seat actuation lifter lifts the diverter gate for actuation.

13. The bypass valve of claim 12, further comprising an O-ring to provide a water-tight seal at the bypass valve.

14. The bypass valve of claim 12, further comprising a hub knob designed to interface with one or more actuator driver devices.

15. The bypass valve of claim 12, further comprising a 10-degree taper with a conical valve seating surface.

16. A bypass system, comprising:

a bypass valve connected to a toilet via a flange, the bypass valve being configured to switch between a first position and a second position based on a user input, wherein the bypass valve comprises an O-ring to provide a water-tight seal at the bypass valve;

a bypass line coupled to the bypass valve at the first position, the bypass line being configured to transfer waste from the toilet to an exit point, bypassing a black tank, based on the bypass system being operated in a first operating mode;

a non-bypass line coupled to the bypass valve at the second position, the first position being different from the second position, and the non-bypass line being configured to transfer the waste from the toilet to the black tank based on the bypass system being operated in a second operating mode; and     a valve actuator operable to switch a position of the bypass valve, and thereby switch an operating mode of the bypass system.

17. The bypass system of claim 16, wherein the valve actuator is a manual valve actuator.

18. The bypass system of claim 16, wherein the valve actuator is an electronic valve actuator operable via a remote-mounted hard-wired switch.

19. The bypass system of claim 16, wherein the valve actuator is an electronic valve actuator operable via touch commands.

\* \* \* \* \*